March 4, 1952  E. C. MAGDEBURGER  2,588,261
ART OF TUNED SUPERCHARGING
Filed Jan. 8, 1948  2 SHEETS—SHEET 1
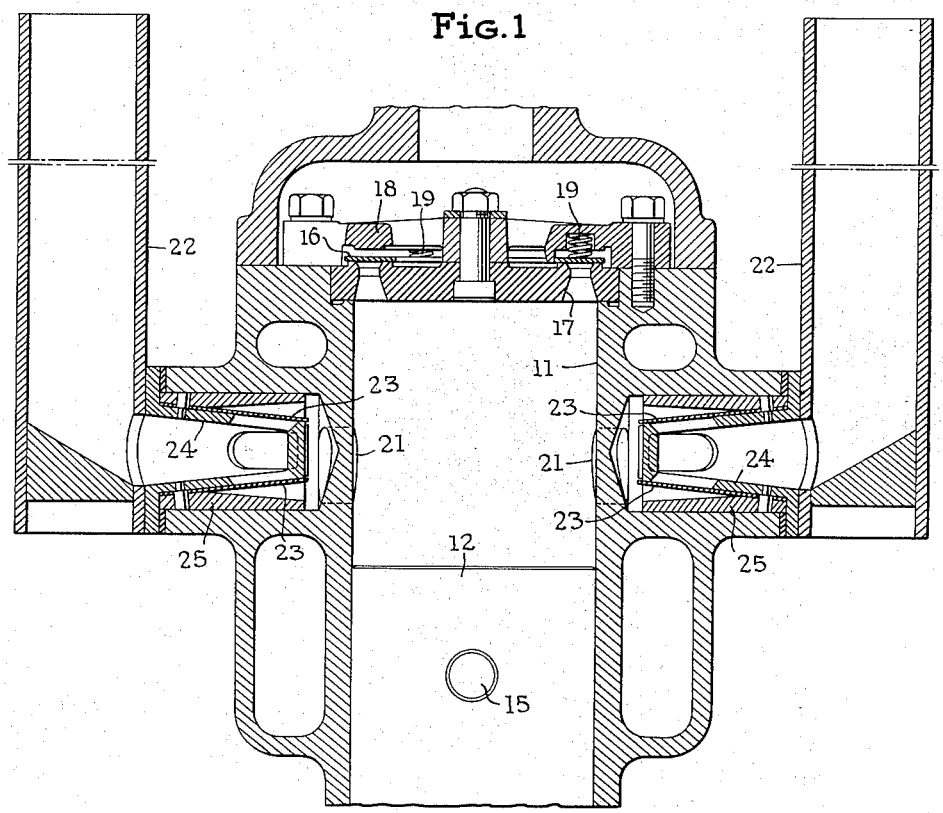
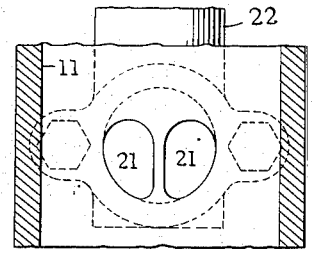
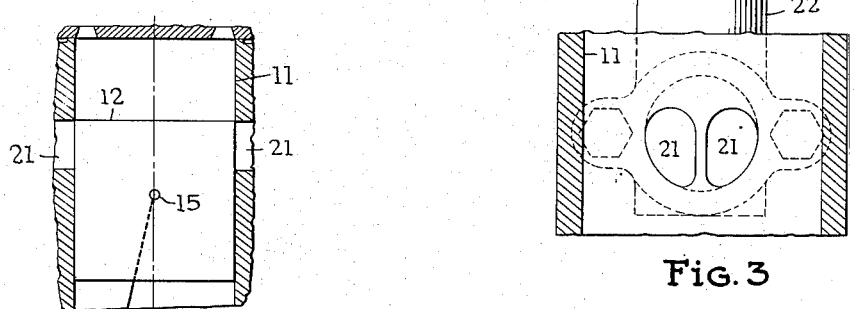
INVENTOR.
Edward C. Magdeburger
BY
ATTORNEYS.

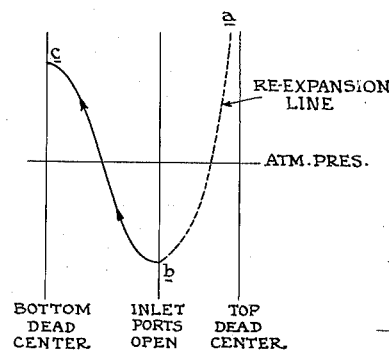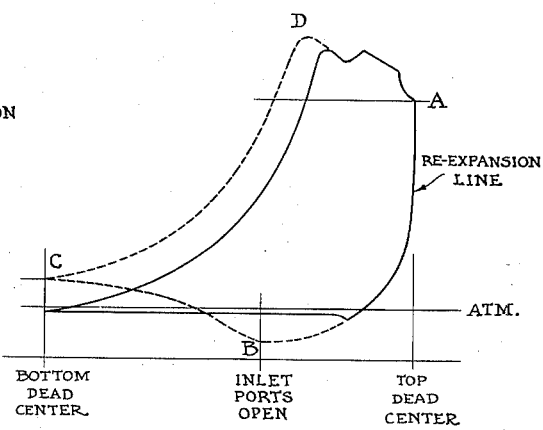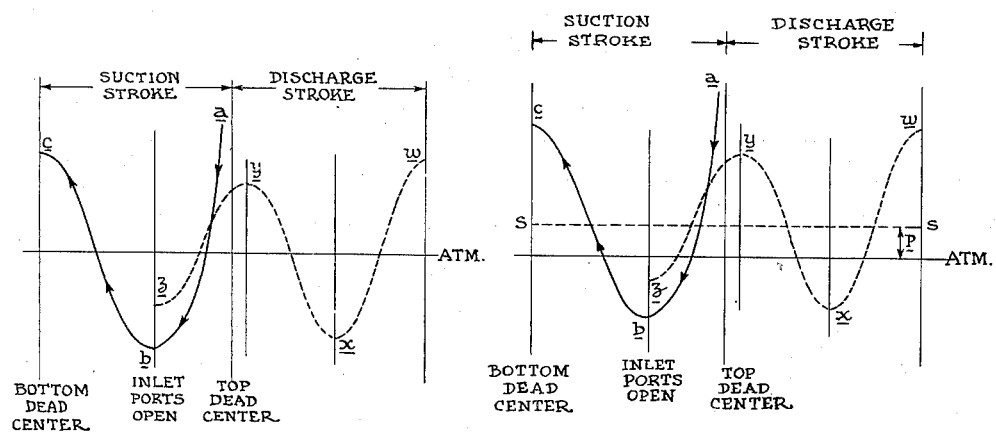

Patented Mar. 4, 1952

2,588,261

UNITED STATES PATENT OFFICE 2,588,261

ART OF TUNED SUPERCHARGING

Edward C. Magdeburger, Washington, D. C.

Application January 8, 1948, Serial No. 1,171

2 Claims. (Cl. 230—2)

This invention relates to supercharging of reciprocating compressors (or any compressor of the expansible chamber type) by exciting pressure waves in the intake pipe and trapping a compression wave in the working space at the end of the suction stroke. To simplify discussion the invention will be described as applied to a single acting reciprocating piston compressor. It can, however, be availed of in double acting compressors and in various more complex relationships, including the supercharging of internal combustion engines.

In the technical literature and in numerous patents there have been proposals to use a "tuned" intake pipe, i. e., one in which longitudinal pressure waves tend to synchronize with the cycles of the compressor, in such a way as to increase the volumetric efficiency of the compressor. Practically the same concept has been proposed for the supercharging of internal combustion engines, the charging cycle of which involves intake and compression phases paralleling similar phases in an ordinary compressor. Embodiments of these concepts in actual machines have failed to give more than a small fraction of the anticipated gains, because, as this applicant has determined, the excitation applied to the air column in the tuned intake is wholly inadequate.

These prior art devices were characterized by intake of air beginning early in the suction stroke. Intake pressure drop constitutes the wave-exciting force, and when this is kept small (as it has been, under the mistaken belief that high vacuum in the cylinder was detrimental to volumetric efficiency) pressure waves of only limited amplitude are produced. As a consequence, a tuned intake pipe, as heretofore used, could afford only modest benefits.

According to the present invention no air is admitted to the cylinder until the piston has moved to about mid-stroke (or preferably its position of maximum lineal velocity). At such time the intake ports are rapidly opened. Preferably they are ports in the cylinder wall, controlled by the piston. As a result the working space is at a low sub-atmospheric pressure when the inlet ports open. Consequently, high-velocity inspiration of air occurs at the start of admission, and this is followed by a pressure wave from the tuned inlet pipe; i. e., an inlet pipe whose length is coordinated with compressor speed.

Similar characteristics could be had by suitably timing a mechanically actuated inlet valve but quicker port opening, more adequate port area, and much greater simplicity may be had by the use of piston-controlled cylinder ports. To prevent back-flow through such ports, some type of free-action large capacity check valve, for example a reed or feather valve, must be provided. The piston starts to open the cylinder ports near mid-stroke, desirably at the point of maximum piston velocity though it could occur with useful results at crank angles of 45° to 135° measured from the head-end dead point.

From what has been said it will be apparent that the invention contemplates use of the following features in combination:

1. An intake pipe tuned to compressor speed.
2. Delay of the start of admission until cylinder pressure has been greatly lowered and the piston is in rapid motion.
3. Coordination of the remainder of the suction stroke with the positive pulse of the approaching air.
4. Some simple quick-opening inlet valve means, to ensure the most rapid attainable opening and inhibit return flow.
5. Consequent marked intensification of wave action in the inlet.

Thus, whereas the prior art regarded wave action in the inlet pipe as an unavoidable evil, and sought to glean from it a part of the loss which it commonly entails, applicant seeks to intensify the wave action to the utmost and put it to work to attain a substantial degree of supercharging.

It is comparatively a simple matter to predict the resonant characteristics of an intake pipe, but it must be remembered that these characteristics are modified when the pipe is in communication with the cylinder, as it is during admission. Moreover, during admission the volume of the working space in the cylinder is rapidly changing, so that even then the resonant characteristics of the combined system are changing.

These details will be discussed after a practical embodiment of the invention has been described, but it is obvious that any initial design based on theoretical considerations will afford only an approximate value for the length of the resonant intake air-column.

Disturbing factors incapable of calculation, prevent precise prediction, but it is possible to predict reasonable limits between which the optimum value will be. Determination of the best value between these limits can best be made by trial and error, either by using an intake pipe adjustable in length, or by varying the speed of operation of the compressor.

Simple embodiments of the invention will now be described by reference to the accompanying drawings, which include diagrams used to explain operative characteristics.

In the drawings:

Fig. 1 is an axial section of a cylinder embodying a preferred form of the invention.

Fig. 2 is a crank-connecting rod diagram illustrating the timing of inlet port opening.

Fig. 3 is a fragmentary axial section of the cylinder, showing inlet ports in elevation.

Fig. 4 is a time-pressure diagram of pressure in the working space during the suction stroke of the piston.

Fig. 5 shows in full lines an indicator card for a conventional compressor, and in dotted lines the change (supercharging effect) entailed by the pressure curve diagrammed in Fig. 4, when made effective according to the invention.

Fig. 6 is a time-pressure diagram for the wave action in the intake pipe and for the compression half wave of Fig. 4, illustrating the wave intensifying effect occurring when the inlet opens.

Fig. 7 is a time-pressure diagram similar to Fig. 6, showing what occurs when air is supplied at elevated pressure to the intake pipe.

In Figure 1 the cylinder 11 and piston 12 enclose the working space. The piston is shown at the bottom dead center (crank end dead point), and is reciprocated by a crank 13 and connecting rod 14 indicated in diagram in Fig. 2. The wrist pin is indicated at 15.

The discharge valve mechanism may be conventional and is shown as a light ring 16 coacting with a ported seat 17 and confined by cage 18. Coil valve springs 19 are used as shown to seat the valve 16.

The inlet ports 21 (see Fig. 3) are formed in the cylinder wall, and in the example illustrated are so located that the piston 12 commences to expose them when the piston has attained its maximum lineal velocity. This position is diagrammed in Fig. 2, and for any ratio of connecting rod to crank is the position in which the crank is at 90° to the rod. For a ratio of connecting rod to crank of 4.5 to 1 the ports start to open at 77½° crank angle measured from top dead center, the crank then being 90° to the rod. The ratio just stated is one commonly used and the example is given as typical of good practice in carrying out the invention.

Two identical tuned inlet pipes are indicated at 22. A portion of each pipe is broken away to reduce the size of the view. A properly dimensioned single inlet pipe and valve may be used with similar effect.

These pipes lead the entering air through reed valves 23 to the inlet ports 21. The valves 23 proper are shown as thin metal reeds which close against a truncated pyramidal seat 24, the seat and reeds being mounted in a sleeve-like cage 25. Free-opening characteristics and adequate port area are the main considerations, and various valves having these qualifications could be substituted.

Stated in the broadest terms, the conspicuously distinctive characteristic of the compressor above described is the fact that the inlet flow does not start with, or even near, the start of the suction stroke of the piston. On the contrary it starts near mid-stroke of the piston and in any case, after pressure in the working space has been greatly reduced, and while the piston is moving near its highest speed. This assures rapid port opening and sudden free flow into a space at low absolute pressure.

More than this is involved however. The waves in the inlet pipe must not merely be tuned to the compressor cycle. A positive pulse should start at the inlets just as the inlet ports open, so that this positive pulse will cause air to flow into the cylinder and fill the working space which is then enlarging because of the continuing downward motion of the piston. This positive pulse is trapped in the cylinder by the check valves 23. For best effect the pulse should persist to bottom dead-center of the piston.

In any theoretical consideration of the subject, account must be taken of the fact that the inlet pipe (to the inlet ports) has a definite period, but this period changes when the cylinder volume is added thereto, and continues to change as the cylinder volume is increased by the downward motion of the piston.

The diagram, Fig. 4 shows how cylinder pressure falls from $a$ to $b$ during the initial portion of the suction stroke and then rises sharply from $b$ to $c$ attaining at $c$ a pressure well above atmospheric at the end of the suction stroke (bottom dead-center).

Fig. 5 shows in solid lines an indicator card for a compressor which draws air from the atmosphere and in which there is no tuned intake pipe, the inlet valves opening at or near the commencement of the suction stroke where the re-expansion line crosses the atmospheric line. In dotted lines the change caused by the use of tuned intake and appropriately delayed opening of the inlet ports is represented. Just as is shown in Fig. 4 the re-expansion line dips below the atmospheric line until the inlet ports open. Then cylinder pressure surges upward to a value above atmospheric. The points A, B, C in Fig. 5 correspond to points $a$, $b$, $c$ in Fig. 4. The compression line C, D is thus raised, since obviously a greater weight of air is compressed per stroke.

In the opening discussion reference was made to intensification of the wave action in the inlet pipes. Fig. 6 is a diagram indicating approximately how this occurs. In this diagram the line $a$, $b$, $c$ is the line so designated in Fig. 4. The sinuous line $w$, $x$, $y$, $z$ represents the wave action in the inlet pipe. The pressure drop $z$—$b$ is the exciting impulse which occurs each time the inlet ports open, and which stimulates the wave action in the inlet pipe.

Fig. 7 is a diagram similar to Fig. 6, but showing the effect of supplying air to the inlet pipes under pressure $p$ above atmospheric. Conventional low pressure blowers may be used to afford elevated supply pressure. In such case the invention functions substantially as before, but with reference to the super-pressure line $s$—$s$ instead of with reference to the atmospheric line as in Fig. 6. Comparison of Figs. 6 and 7 demonstrates the fact that the invention multiplies the performance of the compressor by a similar factor, whether the air be drawn from the atmosphere or from a source at higher pressure. Hence the benefits of the invention are cumulative when used with some conventional means for supplying air at elevated pressure to the intake pipes.

In any case, whether the air be drawn from the atmosphere or from a supply at elevated pressure, the pressure against which the compressor discharges enters as a modifying factor, because it affects the weight of air in the clearance space at top dead center. This determines the form of the curve $ab$ (Fig. 4). The temperature of the ambient air will affect the proper resonating length of inlet pipe or its tuning.

In developing a compressor of 4" bore by 5" stroke, calculations were made to afford three half-waves in the inlet pipe during the period that it is isolated from the working space, and a single half-wave (of lower frequency) during the latter portion of the suction stroke, a period in which the volume of the working space is a part of the pulsating system. To avoid damping effects the internal diameter of the intake pipe was chosen at 2".

The following table gives appropriate values for different rotary speeds:

| R. P. M. | 1,500 | 2,000 | 2,600 |
|---|---|---|---|
| Length of inlet air column in inches | 65 | 48⅝ | 36¼ |
| Crank angle at intake port opening degrees | 78 | 72 | 64.5 |

The length of inlet air column is not the length of the pipe 22 (Fig. 1) but is the total length to the inlet ports 21.

One of the principal aims of this invention is to make possible adequate charging of compressors operating at much higher speed than customary by utilizing high velocities of air entering the cylinder under the stimulus of the large pressure drop created for that purpose.

What is claimed is:

1. A high speed crank driven compressor having a rated speed not materially less than 1500 R. P. M. at which it will develop a volumetric efficiency materially in excess of 100%, said compressor comprising a rotary crank, a piston reciprocable thereby, a cylinder in which said piston reciprocates, the cylinder having at least one inlet port controlled by the piston and so located that the piston starts to expose the inlet port substantially as the piston reaches its maximum lineal velocity; check valve means controlling the inlet port to inhibit back flow therethrough, said check valve being located substantially at the inlet port; in combination with a tuned inlet duct leading to and communicating with said inlet port through said check valve, said duct being of such length as to have at said rated compressor speed a standing wave characterized by a frequency affording two complete waves per cycle of the compressor; and discharge valve means for said cylinder.

2. A high speed crank driven compressor having a rated speed not materially less than 1500 R. P. M. at which it will develop a volumetric efficiency materially in excess of 100%, said compressor comprising a rotary crank, a piston reciprocable thereby, a cylinder in which said piston reciprocates, the cylinder having at least one inlet port controlled by the piston and so located that the piston starts to expose the inlet port substantially as the piston reaches its maximum lineal velocity; check valve means controlling the inlet port to inhibit back flow therethrough, said check valve being located substantially at the inlet port; in combination with a tuned inlet duct leading to and communicating with said inlet port through said check valve, said duct being of such length as to have at said rated compressor speed a standing wave characterized by a frequency affording three half waves during the time the duct is isolated from the cylinder and one half wave while in communication therewith; and discharge valve means for the cylinder.

EDWARD C. MAGDEBURGER.

REFERENCES CITED

The following references are of record in the file of this patent:

UNITED STATES PATENTS

| Number | Name | Date |
|---|---|---|
| 132,891 | Bailey | Nov. 12, 1872 |
| 899,706 | Vogt | Sept. 29, 1908 |
| 1,350,551 | Jewell | Aug. 24, 1920 |
| 1,370,254 | Yearsley | Mar. 1, 1921 |
| 1,503,261 | Broussouse | July 29, 1924 |
| 1,506,786 | Spohrer | Sept. 2, 1924 |
| 1,508,568 | Nelson | Sept. 16, 1924 |
| 1,991,460 | Herzmark | Feb. 19, 1935 |